Figure 1:
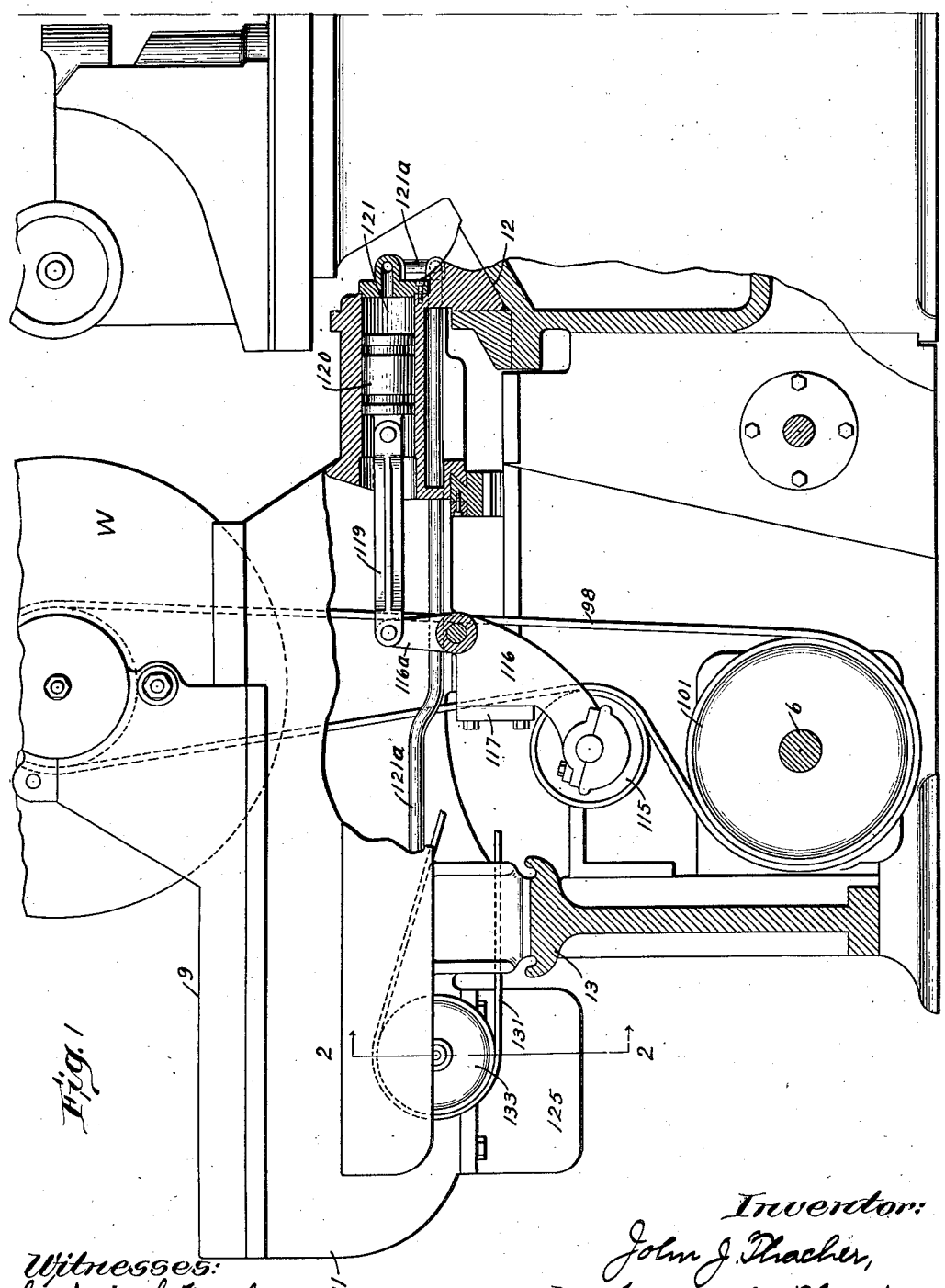

No. 812,899. PATENTED FEB. 20, 1906.
J. J. THACHER.
BELT TIGHTENER.
APPLICATION FILED JULY 3, 1905.

3 SHEETS—SHEET 1.

Witnesses:
Catherine G. Bradley
James H. Thurston

Inventor:
John J. Thacher,
by Wilmarth H. Thurston,
Attorney.

No. 812,899. PATENTED FEB. 20, 1906.
J. J. THACHER.
BELT TIGHTENER.
APPLICATION FILED JULY 3, 1905.

3 SHEETS—SHEET 3.

Witnesses:
Catherine G. Bridley
James H. Thurston

Inventor:
John J. Thacher,
by Wilmarth L. Thurston
Attorney.

UNITED STATES PATENT OFFICE.

JOHN J. THACHER, OF ATTLEBORO, MASSACHUSETTS, ASSIGNOR TO BROWN AND SHARPE MANUFACTURING COMPANY, OF PROVIDENCE, RHODE ISLAND, A CORPORATION OF RHODE ISLAND.

BELT-TIGHTENER.

No. 812,899.     Specification of Letters Patent.     Patented Feb. 20, 1906.

Application filed July 3, 1905. Serial No. 268,029.

*To all whom it may concern:*

Be it known that I, JOHN J. THACHER, of Attleboro, in the county of Bristol and State of Massachusetts, have invented certain new and useful Improvements in Belt-Tighteners; and I do hereby declare the following specification, taken in connection with the accompanying drawings, forming a part of the same, to be a full, clear, and exact description thereof.

The invention relates to devices for maintaining the tension of belts, and has for its object to provide a belt tightening or tensioning device which will maintain the belt at a uniform and constant tension during its operation.

A further object is to provide a device of the above character which will maintain a constant and uniform tension and at the same time will not interfere with the shifting or manipulation of the belt incident to its use in connection with pulleys of different size.

These objects are accomplished by providing a belt-tightening or take-up device which is forced against the belt by the action of a fluid under pressure. The fluid under pressure acts to force the belt-tightening device against the belt with a constant and uniform pressure, and this pressure is unaffected by variations in the position of the belt-tightening device due to any shifting or change in the relative position of the belt upon the pulleys over which it passes or due to a change in the relative position of such pulleys.

A further feature of the invention which may be used with advantage in connection with the feature already referred to consists in maintaining the fluid-pressure for operating the belt-tightening device by means of a pump, which is driven from the same source of power which drives the belt and which ceases its action when the machine in which the belt and pump are embodied is thrown out of action. With this construction the pressure applied to the belt tending to keep it under tension is uniformly maintained during the operation of the belt and is relieved when the belt is out of operation, thus avoiding the strain and tension on the belt when it is idle.

For the purpose of illustrating a concrete application of my invention I have shown in the accompanying drawings the various features of the invention embodied in a grinding-machine.

The various features of the invention will be understood from the following detailed description of the mechanisms illustrated in the drawings and will be set forth in the claims.

Figure 2:
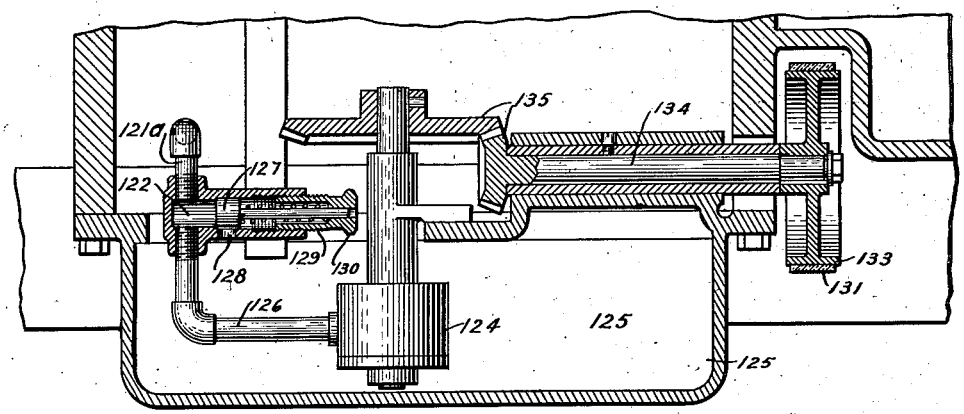
Figure 3:
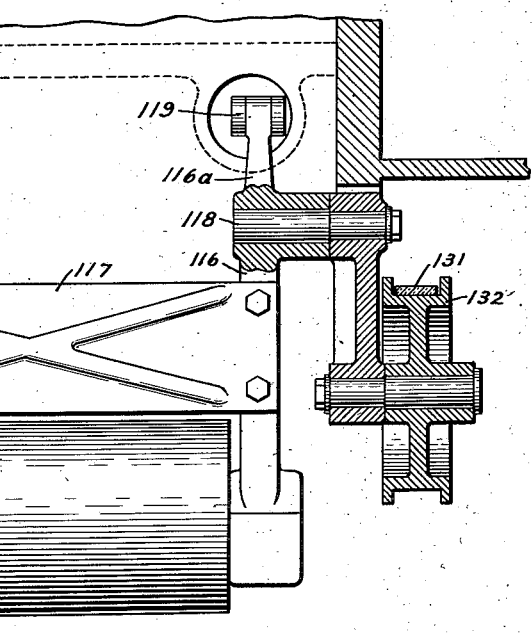
Figure 4:
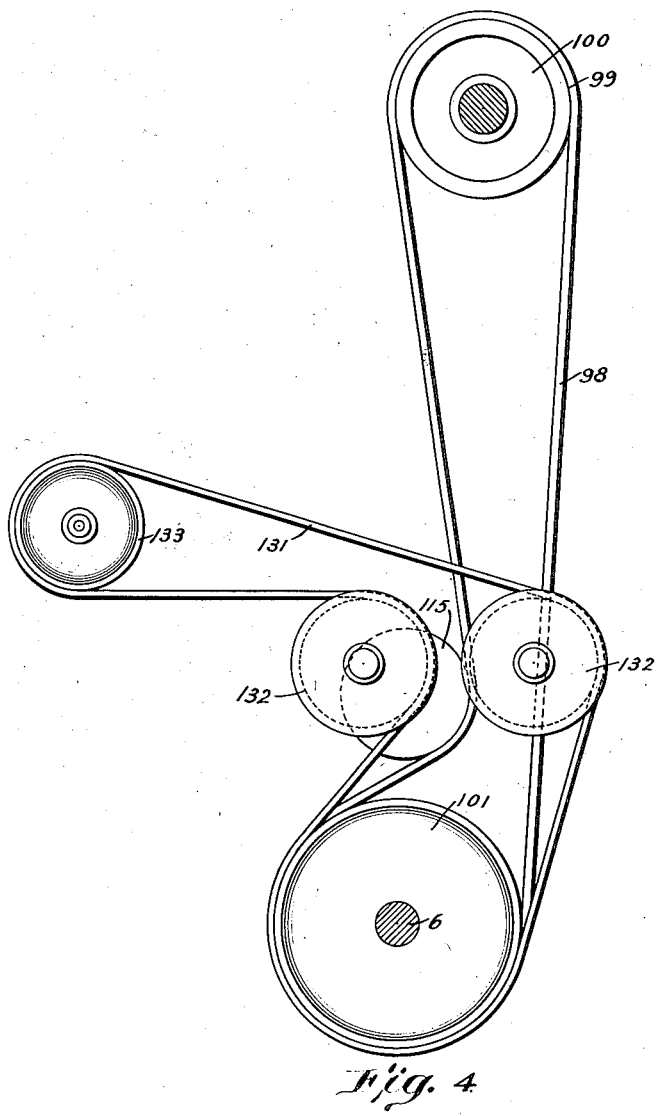

In the drawings, Figure 1 is a transverse sectional elevation showing so much of a grinding-machine as is necessary to illustrate the application of the present invention thereto. Fig. 2 is a vertical sectional view on line 2 2, Fig. 1. Fig. 3 is a detail elevation showing the manner of mounting the belt-tightening pulley, and Fig. 4 is a detail view showing the arrangement of belts for driving the grinding-wheel and the pumping mechanism.

In the construction shown in the drawings the various features of the invention are embodied in a grinding-machine of that type in which the work is supported and revolved upon stationary centers and is acted upon by a grinding-wheel mounted to travel longitudinally of the work while taking a cut and to be moved radially of the work in adjusting it for successive cuts.

The grinding-wheel of the machine is indicated at W, and this wheel is mounted upon a cross-feed slide 9, which is in turn mounted upon a carriage 11. The cross-feed slide 9 is moved backward or forward upon the carriage 11 by suitable mechanism, (not shown,) and the carriage 11 is reciprocated on suitable guideways 12 and 13 by a mechanism which is not shown. The spindle on which the grinding-wheel W is mounted is provided with two pulleys 99 and 100 of different diameters, and the wheel is driven at one of two different speeds by means of a driving-belt 98, which passes over one of the pulleys and around a drum 101, which is secured to a shaft 6 and is driven by any suitable driving means.

The driving-belt 98 is maintained under tension by a belt-tightening or take-up mechanism embodying the features of my invention in the forms in which I prefer to employ them. This mechanism comprises a belt-tightening pulley 115, carried by arms 116 and arranged to engage the belt 98. The arms 116 are connected by a plate 117 and are pivoted upon studs 118, arranged in line with each other and suitably secured in the carriage 11. The pulley 115 is pressed continuously against the belt 98 by the action of a fluid under pressure contained in a cylinder 121 and acting upon a piston 120, mounted in said cylinder. The piston 120 is connected with the belt-tightening pulley 115 by means of a link 119, one end of which is pivoted to the piston and the other end of which is pivoted to an arm 116ᵃ, extending upward from one of the arms 116, which carry the belt-engaging pulley. By the action of the fluid under pressure in the cylinder 121 the pulley 115 is forced against the belt 98 with a continuous and uniform pressure, while said pulley is free to move to accommodate any change in the position of the belt incident to the backward or forward movement of the feed-slide 9 and is also free to move to take up or let out the belt when the belt is shifted from the pulley 99 to the pulley 100, or vice versa. The movement of the pulley 115 incident to such movements or shifting of the belt does not result in any variation of the tension on the belt, since the fluid in the cylinder 121 is maintained at a constant pressure and flows into or out of the cylinder, as the case may be, to accommodate the movements of the belt-engaging pulley.

I prefer to employ oil as the fluid for maintaining the pressure of the belt-engaging pulley, and the oil in the cylinder 121 is maintained at a constant pressure by a pump 124, arranged within an oil-tank 125 and connected with the cylinder through pipes 121ᵃ and 126. The pipe 126 leads from the pump to a pressure-chamber 122, and the pipe 121ᵃ leads from this pressure-chamber to the cylinder 121, back of the piston 120. The pump during its operation acts to continuously force the oil through the pipe 126, and any excess of oil over and above that required to maintain the pressure upon the piston 120 escapes from the pressure-chamber 122 through a regulating-valve 127, which controls the communication between the chamber 122 and a discharge-port 128. This regulating-valve is held to its seat by a spring 129, the tension of which may be adjusted by an adjusting-sleeve 130. During the operation of the pump a pressure will be maintained in the pipes and in the cylinder 121 equal to the pressure required to compress the spring 129 and open the regulating-valve. The pump 124 is driven continuously during the operation of the driving-belt 98 by means of a belt 131, passing over the drum 101, over guiding-pulleys 132, and over the driving-pulley 133 for the pump mechanism. The pulley 133 is connected with the pump through a shaft 134 and bevel-gears 135, which connect the shaft 134 with the pump-shaft. With this construction the pump will act to maintain the pressure within the cylinder 121, and thus force the belt-engaging pulley against the belt with a uniform pressure during the time that the belt is in operation; but whenever the machine is stopped and the drum 101 ceases to revolve then the pump will cease to act and the pressure in the cylinder 121 will fall, thus relieving the tension upon the belt.

While I have shown and described my invention embodied in a grinding-machine, it will be understood that the various features of the invention may be used with advantage either separately or in connection with each other in other machines and in other relations where it is desirable to maintain a constant tension upon a belt. It will also be understood that the details of construction and arrangement may be varied in embodying the features of invention in different constructions and adapting them for the most efficient operation under varying conditions.

Without attempting to set forth in detail the various modifications and changes which may be made in embodying my invention in different constructions, what I desire to claim and secure by Letters Patent is—

1. A belt-tightening mechanism comprising a belt, a belt-engaging device, a piston connected with said device, devices for maintaining a fluid-pressure on said piston, and driving mechanism for the belt and connection for driving the pressure-maintaining devices from said driving mechanism, substantially as described.

2. A belt-tightening mechanism comprising a belt, a belt-engaging device, a piston connected with said device, and devices for maintaining a fluid-pressure on said piston driven from the driving mechanism for the belt.

3. A belt-tightening mechanism comprising a belt-engaging device, and means for forcing the device against the belt by fluid under pressure, which are rendered inoperative upon the stopping of the belt.

4. A belt-tightening mechanism comprising a belt-engaging device, a piston connected with the device, and a pump for maintaining fluid-pressure on the piston and a common driving mechanism for the pump and belt.

JOHN J. THACHER.

Witnesses:
J. H. THURSTON,
W. H. THURSTON.